United States Patent [19]

Diamantoglou et al.

[11] 4,056,400
[45] Nov. 1, 1977

[54] OXIDATION PRODUCTS OF CELLULOSE, HEMICELLULOSE AND LIGNIN

[75] Inventors: Michael Diamantoglou, Erlenbach; Helmut Mägerlein, Obernburg; Rainer Zielke, Erlenbach, all of Germany; Emery George Philomena Cornelissens, Nootdorp, Netherlands

[73] Assignees: Michael Diamantoglou, Erlenbach; Helmut Mägerlein, Obernburg; Rainer Zielke, Erlenbach, all of Germany

[21] Appl. No.: 599,364

[22] Filed: July 28, 1975

[30] Foreign Application Priority Data

July 31, 1974 Germany .................. 2436843

[51] Int. Cl.$^2$ .................................. C08L 1/00
[52] U.S. Cl. .................. 106/162; 106/163 R; 162/6; 162/9; 162/71; 162/88; 162/89; 536/36; 536/56
[58] Field of Search ............ 260/212; 162/6, 9, 88, 162/89, 73; 536/56; 8/108–110; 106/162, 163

[56] References Cited

U.S. PATENT DOCUMENTS

| 2,140,863 | 12/1938 | Sunesson | 260/212 |
| 3,878,037 | 4/1975 | Hansen | 8/108 |
| 3,907,632 | 9/1975 | Christiansen | 162/88 |

FOREIGN PATENT DOCUMENTS

45-7003   2/1970   Japan.

OTHER PUBLICATIONS

Offenlegunsschrift, M6.8151, 1964.
The PH Factor in the Hypochlorite Bleaching of Wood Pulp, Ferri Casciani et al.

*Primary Examiner*—Theodore Morris
*Attorney, Agent, or Firm*—Keil, Thompson & Shurtleff

[57] ABSTRACT

A composition which consists essentially of a mixture of oligomeric and polymeric oxidation products of cellulose, hemicellulose and lignin containing carboxy, ether and hydroxy groups as obtained by the direct oxidation of a woody plant material, preferably in an aqueous suspension thereof, using alkali hypohalite in a one stage oxidation procedure or nitrogen dioxide, alkali periodate or lead tetraacetate followed by alkali chlorite or alkali hypochlorite in a two stage oxidation procedure. The resulting oxidation products as obtained by one of these specific processes are especially valuable as additives to a surface active detergent or cleaning agent.

13 Claims, No Drawings

OXIDATION PRODUCTS OF CELLULOSE, HEMICELLULOSE AND LIGNIN

Additives such as builders or sequestering agents do not possess any cleaning or detergent power themselves but are often useful in increasing the effectiveness of soaps and synthetic detergents or cleaning agents which do have cleaning or detergent power. For example, such detergent additives may be used to from complexes with metal ions in the wash liquid, to neutralize acid components of the soiling or contaminating materials, to emulsify dirt particles or to peptize or solubilize impurities as well as to influence the interfacial and surface active properties of the wash liquid.

As these additives, there have been used in the past such compounds as alkali carbonates, borates, phosphates, bicarbonates and silicates, especially the alkali polyphosphates. However, polyphosphates are disadvantageous in that they are difficult to hydrolyze to lower phosphates. Much more troublesome is the fact that the polyphosphates are not biodegradable. These compounds pass with waste water into rivers, streams and lakes and contribute in a substantial extent to the eutrophication of the waters Also, organic complexing compounds such as for example the sodium salts of ethylene diaminotetraacetate and nitriloacetic acid are commonly recommended as additives for detergents or the like. However, because of their strong complexing of the heavy metals and transition metals, they are less suitable due to a severe disturbance of the biological or ecological equilibrium.

Further known is the use of citric acid, dicarboxylated starch, carboxymethylated polysaccharides, polymaleic and polyitaconic acids and the copolymers with unsaturated carboxylic acids, olefins or short-chained unsaturated aliphatic ethers or alcohols as well as a few other synthetic polycarboxylic acids.

From the German published patent application (DT-OS) 2,040,948, there are known carboxyl- and hydroxyl-group containing oxidation products of polymeric and oligomeric saccharides, such as for example starches, dextrin, cellulose, glycogen, saccharose, or oxidation products of polyuronic acids such as pectin and algin or even of gums such as agar or gum arabic. These products are obtained according to a two stage oxidation procedure whereby the monosaccharide ring is opened in the first stage and aldehyde groups are formed while part or all of the aldehyde groups are oxidized to carboxy groups in the second stage. According to the patent disclosure, it is especially desirable to use periodic acid, a periodate or lead tetraacetate in the first stage and an alkali hypohalite in the second stage. Also, according to one economical process, the products are accessible by use of alkali hypohalites as the oxidizing agent. Those products have outstanding properties as sequestering or chelating agents and are therefore useful as additives for detergents and cleaning agents. For economical reasons, however, one is practically limited to the use of starch and cellulose as the initial materials to be oxidized, and even these substances are relatively expensive as refined or processed raw materials.

It is further known from Netherlands patent specification (NS-PS) 78,087 that one may oxidize woody materials without destroying cellulose but to such an extent that high molecular weight basically binding oxidation products arise which are considered to be useful as additives to detergents or cleaning agents. The oxidation is carried out by means of gaseous nitrogen dioxide or in an aqueous medium by means of nitric acid and nitrite or by means of nitric acid and nitrogen dioxide. The oxidation products according to this process have a comparatively low sequestering or building capacity and have not found any practical use as a commercial additive.

From the German patent specification (DT-PS) 930,388, a process is known for the oxidation of high molecular weight carbohydrates by means of nitric acid whereby the oxidation is carried out in the presence of substances free of nitrite groups and reducing nitric acid to NO and/or $NO_2$ or $N_2O_4$ and preferably in the presence of oxygen or oxygen-containing gases. In this case, it is also possible to use as the carbohydrate a raw material containing cellulose, e.g. wood pulp or flat shavings. However, the products obtained according to this process also possess only a slight capacity for forming complex metal compounds and therefore are not suitable as additives for detergents or cleaning agents.

It has now been surprisingly found, in accordance with the present invention, that by using a special oxidation procedure, one can obtain from wood or any woody material a composition which consists essentially of a mixture of oligomeric and polymeric oxidation products of cellulose, hemicellulose and lignin containing carboxy, ether and hydroxy groups, said composition having excellent properties as an additive for detergents and cleaning agents. The mixture of oxidation products is essentially obtained by the oxidation of a woody plant material in one stage with an alkali hypohalite or in two stages with nitrogen dioxide, alkali periodate or lead tetraacetate as the first stage oxidizing agent and with alkali chlorite or alkali hypochlorite as the second stage oxidizing agent. The preferred oxidation conditions are given in greater detail hereinafter.

Wood is known as the secondary permanent tissue of the stems, branches and roots of trees and bushes or shrubs, and the terms "woody material" and "woodlike substances" are used herein to refer to this essentially permanent tissue of plants and especially trees. Therefore, as the raw material for the process of the present invention, it is especially desirable to use all readily available soft and hard woods, including the following by way of example: spruce; fir; pine; larch; aspen; birch; beech; oak; poplar; maple; alder; willow; ash; horse chestnut; Spanish chestnut; yew; cherry; plum; pear; apple; plane; walnut; box; locust; Abachi; Abura; Agba; Alerce; balsa; Brazil pine; kapok; Ilomba; Okume; redwood; umbrella tree; Afrormosia; Basralocus; Doussi; eucalyptus; hickory; Iroko; Khaya; Limba; lauan; mahogany; Makore; Mansonia; Niangon; rosewood; Paduk; pitchpine; Ramin; Sapelli; Sipo; Tchitola; teak; Wenge; Yang; amaranth; Bongossi; ebony; ironwood; greenheart; granadilla; pockwood; and quebracho. In fact, there is no limit as to the species of trees which may be selected for purposes of the present invention, and it is possible to include all parts of the tree including roots, branches, bark, leaves, etc., so that a wide variety of waste wood materials can be usefully employed.

Still other useful woody materials include rapid growing plants which quickly form a woody tissue or annual plants after such woody tissue is formed. Such other materials having a composition or structure which is equivalent to the wood of trees or shrubs include for example: bamboo; reeds or rushes; grass; esparto; sorghum and especially the straw or waste portions of useful plants, e.g. wheat, barley, oats, corn and rape as well as bagasse. Waste paper, cardboard or the like is also suitable as a raw material and may be admixed with other woody materials.

On the average, the chemical composition of the wood and any remaining raw material is about 25 – 50% cellulose, 20 – 35% hemicellulose and 20 – 30% lignin. Further non-essential components include resins, fats, greases, oils, tannin and minerals as well as water. The novel composition of the present invention therefore consists essentially of a mixture of oligomeric and polymeric polycarboxylic acid derivatives which also contain hydroxy groups as obtained by the prescribed oxidation of the cellulose, hemicellulose and lignin content of the woody raw material. The carboxylic groups are formed in the oxidation of 6-hydroxymethyl groups of the cellulose and also in the raw materials containing oligomeric and polymeric saccharides. Further carboxy groups arise through the oxidative splitting of anhydroglucose rings between the carbon atoms standing in the 2- and 3-positions. The hemicellulose already contains a few carboxy groups and more are formed as with cellulose by the oxidative splitting of the anhydroglucose rings. In the case of lignin, the primary as well as the secondary hydroxy groups are oxidized partly to carboxy groups and partly to keto groups. Still additional carboxy groups are formed by hydrolysis of the ether groups of the lignin and subsequent oxidation of the resulting primary alcohol groups.

The oxidized mixture obtained from coniferous soft woods, e.g. pine or fir, generally exhibits a poorer complex-forming capacity than that obtained from deciduous hardwood trees, barks, the quickly growing woody plants and/or annual plants. The hardwoods as derived from deciduous (broadleaf) trees or the like are therefore especially preferred for purposes of this invention.

The complexing or sequestering capacity of the oxidized mixtures obtained from woody materials according to the invention can be improved still further if the calcium content of the wood is reduced prior to oxidation. This reduction is calcium content can be accomplished by treatment of the wood with a suitable complexing agent for the calcium such as pentasodium triphosphate. In this manner, about half of the calcium content of the wood is removed and obviously that portion which is dissolved in the wood sap. The portion of the calcium which is bound to the polyuronic acid of the wood is less easily separated. It is not necessary to remove such residual portions of the calcium because the expense is much higher and the resulting oxidized product of the invention already exhibits outstanding complexing properties after removing only the easily separated calcium content.

The oxidation product of the invention, which is a mixture consisting essentially of oligomeric and polymeric oxidation products of cellulose, hemicellulose and lignin containing carboxy, ether and hydroxy groups, is produced in a process which requires the woody material, e.g. wood, bar, leaves, quickly maturing woody plants and/or annual or year-old plants, to be oxidized in a single stage procedure by means of an alkali hypohalite or in a two stage procedure by means of nitrogen dioxide, alkali periodate or lead tetaacetate as the oxidizing agent in the first stage followed by the use of alkali chlorite or alkali hypochlorite as the oxidizing agent in the second stage.

The term "alkali" is employed herein to refer to the alkali metals and especially sodium and potassium. Sodium compounds as the oxidizing agents are especially useful in the single stage procedure, e.g. sodium hypohalites and particularly sodium hypochlorite and sodium hyopobromite. In the two stage procedure, one may use as the first stage oxidizing agent an alkali periodate such as sodium periodate as well as nitrogen dioxide and lead tetraacetate. The second stage oxidizing agent is an alkali chlorite such as sodium chlorite or the alkali hypochlorite and especially sodium hypochlorite. For economical reasons, it is preferred to use sodium hypochlorite and nitrogen dioxide as readily available oxidizing agents. Only the alkali hypohalites and especially the hypochlorites are used for the single stage procedure with suprisingly good results. According to the preferred two stage procedure, the woody initial material is first oxidized with the alkali periodate, lead tetraacetate or preferably nitrogen dioxide and then subsequently oxidized with an alkali chlorite or hypochlorite, preferably the sodium hypochlorite.

The woody plant material to be oxidized is best put into a finely divided or easily dispersible form, e.g. as sawdust, ground wood, ground straw or waste woody materials, preferably as a finely ground powdery or dust material as compared to wood chips, shavings or the like. However, it is an advantage of the invention that one may use a wide variety of waste woody plant materials of different particle sizes and merely recycle those portions which do not become fully treated during the oxidation stage or stages. The initial woody material is preferably oxidized in an aqueous suspension with insoluble portions subsequently being separated and the desired oxidation products then being precipitated in the form of their salts by the addition of a water-miscible organic solvent which acts as a precipitating agent, e.g. alcohols, acetone, methylethylketone, dioxane and tetrahydrofuran. The lower alkanols, including primary, secondary or tertiary alcohols of 1 – 4 carbon atoms, are especially preferred as the precipitating agent.

Preferred products of the invention are those obtained when the oxidation of the initial woody materials is carried out by mean of alkali hypohalite and especially sodium hypochlorite at pH-values in the range of about 8 to 10 and at temperatures ranging from about 0° C. to 40° C., especially about 10° – 25° C. When using the single stage process, the oxidation can proceed according to two different techniques. According to the first and most preferred technique, the finely divided or powdery woody material is first suspended in a little water and then reacted simultaneously with halogen and aqueous alkali hydroxide, e.g. sodium hydroxide, these reactants being conducted simultaneously into the suspension under cooling. The shortest reaction times can be achieved with this first technique. According to the second technique which requires relatively longer reaction times, the material to be oxidized is introduced into an aqueous alkali hypohalite solution cooled to about 0° C. in order to begin the reaction. It has been shown that both of these techniques form about the same proportion of soluble oxidation products, but the products of the first technique in this single stage oxidation possess a higher complexing or sequestering capacity and are therefore more suitable as additives for detergents or cleaning agents.

Under the conditions of the oxidation reaction, one must suspect that a depolymerization reaction occurs in addition to the formation of high molecular weight polycarboxylic acids, especially with lignin and with at least a portion of the hemicellulose, which as a lower molecular weight structure permeates the lignin substances, and that the lower molecular weight polycarboxylic acids obtained in this manner are able to accomplish only a diminished contribution to the complexing effect of the product as a mixture of oligomers and polymers. In the first single stage technique according to this invention, this depolymerization reaction is substantially avoided since the hypohalite resulting from the addition of alkali hydroxide and halogen is immediately consumed in the formation of carboxy groups and the reaction times are also relatively short. According to the second processing technique in a single stage, the high content of alkali hypohalite and the longer reaction times tend to cause a stronger depolymerization. Thus, it has been shown that there is a direct connection between the degree of polymerization of the oxidizing product and its capacity of complexing or providing a sequestering effect.

In the oxidation by means of the alkali hypochlorite, hypochlorous acid participates as well as the hypochlorite ion. The optimum pH-value for the oxidation when using sodium hypochlorite lies between about 8 and 10. In this range, conditioned by a favorable proportion of the two components, the oxidizing power of the hypochlorite is large and its tendency for decomposition or dissociation is relatively slight. Under these pH conditions, one achieves the best yields of the polycarboxylic acids as well as the best complex-forming properties. At pH-values substantially below 8 and above 10, smaller amounts of the oxidation products are obtained with relatively poorer complexing or sequestering properties. This result may be attributed to the fact that at pH-values below 8, part of the hypochlorite disproportionates into chlorate and chloride and there is a greater tendency toward the depolymerization reaction. Above a pH-value of 10, there are present practically only the hypochlorite ions which then cause a sufficient oxidation only at higher temperatures which tend to also have an adverse effect on the desired complex-forming properties. This same result is also observed with other alkali hypohalites so that the careful maintenance of pH between about 8 and 10 is relatively important in ensuring good results.

The optimum oxidation with alkali hypohalite occurs at temperatures between about 10° and 25° C. In general, oxidation temperatures below 10° C. and especially less than 0° C. require excessively long reaction times. On the other hand above 25° C. and especially above 40° C., one may achieve higher yields of polycarboxylic acids but there will also be a marked increase in the depolymerization causing relatively poorer complexing properties of the oxidation product. Furthermore, at higher oxidizing temperatures, one must expect an increasing disproportionation of the hypochlorite into chlorate and chloride so that either a greater amount of hypochlorite must be added as compared to working at lower temperatures or a lower yield must be taken into account.

The required reaction time is dependent upon and conformed with the hypohalite oxidation according to the particular process technique being used. In the first technique according to the single stage process, according to which the initial finely divided woody substance is suspended in a little water and then reacted simultaneously with chlorine and aqueous alkali hydroxide, the yield and the complex-forming capacity of the carboxylic oxidation product is already quite satisfactory after a reaction period of about 5 hours. The best results are obtained with a reaction time of about 8 hours so that one can generally rely on a total reaction time of between about 5 and 10 hours in most cases. If the reaction time is extended for excessively long periods of time of more than 8 hours and especially more than 10 hours, a product of somewhat slighter complexing capacity is obtained, most likely because of depolymerization.

When following the second processing technique in the single stage oxidation, according to which the initial woody substance is introduced into a completely formed alkali hypochlorite solution, one must observe substantially longer reaction times. For example, when oxidizing beechwood as the initial material, the oxidation is first completed after about 20 hours.

In both procedures of the single stage process as well as in the two stage process, shorter reaction times lead to lower yields and to a mixture of polycarboxylic acids with poorer complexing properties. The degree of oxidation of the mixture according to the invention is thus important in achieving the complexing capacity or sequestering ability for use with detergents or the like. In addition to a sufficient reaction time, the degree of oxidation also depends upon the amount of the oxidizing agent added to the reaction mixture. As a rule, it has been found that for the production of the composition of the invention with good complexing properties, one should ordinarily use at least two parts by weight of sodium hypochlorite for each part by weight of initial woody material. With respect to other specific oxidizing agents, the following proportions should be used as a guide or approximation for each part by weight of initial woody material: at least five parts by weight of sodium hypobromite; at least one part by weight of $NO_2$ plus one part by weight of NaOCl; and at least one part by weight of $NaIO_4$ together with two parts by weight of NaOCl. (The combination of two oxidizing agents is directed of course to the two stage process.) The largest part of the hypohalite is used up for the oxidation of the cellulose, hemicellulose and lignin, a minor part is used for the oxidation of other woody components and a slight amount is lost by disproportionation.

In general, then, one uses an excess of at least about two parts by weight of total oxidizing agent for each part by weight of the woody plant material being oxidized.

The above-noted process conditions are generally applicable to other oxidation agents useful in this process, but the results are highly dependent on the selection of the oxidizing agent. For example, if sodium hypochlorite is used in place of sodium hypochloride then a final product is obtained which has a complexing capacity which surprisingly exceeds that achieved with any other oxidizing agent. However, because of the relatively high price of bromine, an oxidation with sodium hypobromite has less technical interest. It is for this reason that sodium hypochlorite is of particular importance, i.e. where surprisingly good results are achieved even with this much less expensive oxidizing agent.

When using alkali periodates, nitrogen dioxide or lead tetraacetate, the oxidation must be carried out in two stages. It is believed that the first stage oxidation of the initial woody material, i.e. consisting essentially of the mixture of cellulose, hemicellulose and lignin, using these three oxidizing agents, results in a glycol splitting into polymers containing aldehyde groups which are then converted by means of alkali chlorite or alkali hypohalite into the desired polycarboxylic acids. The first stage of this process is preferably carried out with nitrogen dioxide and the second stage with sodium hypochlorite. The oxidation product obtained in the two stage process exhibit excellent complexing properties when used in combination with detergents or other cleaning agents.

The compositions of the invention may be used with any suitable surface active agent having a detergent or cleansing action in order to enhance the removal of soil or other impurities from textile materials or in other cleaning operations, especially where a strong complexing or sequestering effect is desired. The new compositions are especially useful with synthetic sulfonated and sulfated detergents as a replacement for the ecologically harmful phosphates, but they may also be incorporated with conventional soaps, cleansers and surface active detergents wherever good complexing or sequestering properties are required.

The preferred oxidized products of the invention are those obtained by means of an alkali hypohalite, especially sodium hypochlorite or hypobromite at pH-values in the range of about 8 to 10 and at temperatures of about 10° to 25° C. In addition, those oxidized products are also preferred as obtained in the two stage oxidation, first with nitrogen dioxide and then with an alkali hypohalite, especially sodium hypochlorite.

The products of the invention as complexing or sequestering additives have an at least equally high and even a higher effectiveness than the known additives. Moreover, the new products are advantageous in being biodegradable so that pollution and eutrophication problems can be avoided.

The previously known polysaccharide derivatives are far too expensive for practical use, e.g. in requiring refined or purified cellulose or starch, so that the new oxidation products as mixtures derived from cheap woody materials offer a very economical and useful alternative with surprisingly good results not previously demonstrated or suggested in this art.

Sawdust and wood powder accumulate in lumber mills in amounts of up to 15% of the total wood being processed. Also, the bark, leaves, straw and other residual woody waste materials such as rapidly maturing plants or year old plants are easily available and quite inexpensive as raw materials. It is desirable to grind or pulp all such materials to achieve a fine dispersion of woody particles in an aqueous medium, but this may also be accomplished at relatively low cost with existing facilities, e.g. as in paper mills or the like. Waste paper and other recycled cellulosic products may also be easily incorporated into the oxidation process of the invention and the resulting mixture of oxidized products.

The invention is further illustrated by but not limited to the following examples. Parts and percentages are by weight unless otherwise noted.

EXAMPLES 1 and 2

These first two examples are concerned with the production of the oxidation products of the invention using sodium hypochlorite as the essential oxidizing agent in a single stage. The first technique, identified as Process A, is that in which the raw woody material in an aqueous suspension is reacted simultaneously with chlorine and sodium hydroxide, i.e. so that sodium hypochlorite is produced in situ; the second technique, identified as Process B, is that in which an already prepared sodium hypochlorite solution is used as the reaction medium to which the woody material is added.

EXAMPLE 1

According to Process A, 100 g of poplar dust was suspended in 880 ml of water and the pH-value of the aqueous medium adjusted to 9. Then, within a period of four hours, 285.9 g of chlorine were gradually introduced simultaneously with 322.2 g of sodium hydroxide fed dropwise at a 25% aqueous solution, such that the pH-value remained between about 8 to 9 and the temperature was held between 10° and 20° C. by cooling. In order to complete the oxidation reaction, the resulting mixture was then stirred for still another three hours, the pH-value being maintained at the desired value by further addition of the 25% sodium hydroxide solution. Upon completion of the reaction, the mixture was filtered in order to separate undissolved components and then introduced into 6500 ml of methanol. The sodium salt of the oxidation product precipitated out in an easily filterable form. It was filtered by suction and then dried in a vacuum chamber at 50° C.

Product yield = 80.5 g.

A further purification of this product is not necessary. It contains a maximum of 1 – 2% NaCl. Its sequestering properties are very good.

EXAMPLE 2

According to Process B, 352.9 g of NaOH were first dissolved in 2350 ml of water, the solution cooled with an ice/NaCl mixture of 0° C. and 313.2 g of chlorine then introduced into the solution. To this initially prepared sodium hypochlorite solution, there were added 100 g of poplar dust. The resulting reaction mixture was first stirred for 2 hours at about 0° C. to 5° C. and then slowly warmed up to room temperature. The pH-value was maintained between 8 and 9 by the addition of a 25% sodium hydroxide solution in water. After a total reaction period of about 20 hours, the reaction mixture was filtered off by suction and the filtrate worked up as in Example 1.

Product yield = 96.7 g. In order to determine the complex-forming capacity of the oxidation product mixtures, water with a total hardness of 15° dH was treated with 1.5, 2.0 and 3.0 g/l of the mixture oxidation products produced according to the invention, and the residual hardness of the water was then determined by means of a Ca-selective electrode. The German degree of water hardness (1° dH) corresponds to an amount of 10 mg of CaO in one liter of water. The following summarizes the results of such hardness tests for the first two examples:

|  | Residual hardness (° dH) after treatment with | | |
|---|---|---|---|
|  | 1.5 g/l | 2.0 g/l | 3.0 g/l |
| Example 1 | 0.38 | 0.13 | 0.05 |
| Example 2 | 1.19 | 0.49 | 0.14 |

EXAMPLES 3 – 18

Following the same conditions prescribed in Examples 1 and 2, i.e., using both Processes A and B, various different woods as well as barks, leaves, straw, hay, reeds and bamboo were oxidized in accordance with the invention. The woods were used in the form of a wood dust or powder and the other woody plant materials were also used after grinding to a finely divided powder or very short fibers. The following Table 1 summarizes the results for each example, first setting forth the raw woody material used and the proportion of insoluble product as well as the yield of the desired oxidation product which is given as grams per 100 grams of the initial woody material. The sodium content of the separated product mixture is given as a measure of the degree of oxidation as well as giving the calcium content of the final product.

EXAMPLES 19 – 24

One part of beech dust was oxidized for 20 hours with 2.6 parts of sodium hypochlorite at a temperature of 15° – 20° C. and at different pH-values in the procedure otherwise as described in Example 2. From the results given in the following Table 3, it will be apparent that by maintaining the pH-value in a range of about 8 to 10, very good results are achieved with respect to the yields and the effectiveness of the complex-forming product.

TABLE 3

| Ex. No. | pH | Insolubles (% by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 19 | 6–7 | 27 | 46 | 15.3 | 0.27 | 2.7 | 1.56 | 0.52 |
| 20 | 7–8 | 36 | 51.5 | 15.3 | 0.25 | 2.5 | 1 | 0.25 |
| 21 | 8–9 | 6.2 | 108 | 22 | 0.12 | 0.57 | 0.17 | 0.042 |
| 22 | 9–10 | 15 | 92.8 | 20 | 0.13 | 0.94 | 0.31 | 0.05 |
| 23 | 10–11 | 26 | 74 | 17 | 0.13 | 1.56 | 0.72 | 0.21 |
| 24 | 13–14 | 39 | 46.2 | 13 | 0.23 | 4.66 | 2.92 | 0.96 |

TABLE 1

| | | PROCESS A | | | | PROCESS B | | | |
|---|---|---|---|---|---|---|---|---|---|
| Ex. No. | Raw woody Material | Insolubles (% by wt.) | Yield (g/100 g) | Na (%) | Ca (%) | Insolubles (% by wt.) | Yield (g/100 g) | Na (%) | Ca (%) |
| 3 | Beech | 24.3 | 66 | 16.4 | 0.13 | 23.2 | 76 | 17.15 | 0.12 |
| 4 | Willow | 26.5 | 57 | | | | | | |
| 5 | Oak | 16.6 | 64 | 18.2 | 0.11 | 16.9 | 83.5 | 18.1 | 0.1 |
| 6 | Birch | 0.8 | 96.4 | 19.5 | 0.05 | 14.3 | 81.9 | 18 | 0.05 |
| 7 | Poplar Bark | 20.1 | 60.2 | 19.2 | 0.35 | | | | |
| 8 | Poplar leaves | 30.2 | 47 | 22 | 0.15 | | | | |
| 9 | Apple | 15.3 | 84.9 | 18.6 | 0.11 | 22 | 88.8 | 18.6 | 0.11 |
| 10 | Pine | 13.9 | 54.4 | 18.4 | 0.1 | 20.6 | 66.3 | 17 | 0.1 |
| 11 | Fir | 13.5 | 56.8 | 18.4 | 0.25 | | | | |
| 12 | Spruce | 20.6 | 76.2 | 17.2 | 0.06 | 25.5 | 67.7 | 16.7 | 0.05 |
| 13 | Larch | 14.4 | 68.2 | 18.4 | 0.1 | | | | |
| 14 | Cotoneaster | 8.9 | 68.2 | 18.5 | 0.23 | 22.6 | 77.9 | 18.9 | 0.25 |
| 15 | Straw | 12 | 79.6 | 19.6 | 0.12 | 12.8 | 83.6 | 19.1 | 0.15 |
| 16 | Hay | 11.7 | 82 | 21.1 | 0.13 | | | | |
| 17 | Reeds | 14 | 80 | 19.7 | 0.04 | | | | |
| 18 | Bamboo | 9.6 | 87.2 | 20.6 | 0.1 | | | | |

The commplexing properties of these various products of the invention were determined as in the first two examples and are summarized in Table 2.

EXAMPLES 25 – 28

The tests described in Examples 19 – 24 were carried out with a straw dust in place of the beech dust. The results are given in Table 4. Here it is also shown that better results are obtained in the pH range of 8 to 10.

TABLE 2

| | | Process A | | | Process B | | |
|---|---|---|---|---|---|---|---|
| | | Residual hardness (° dH) after treatment with | | | Residual hardness (° dH) after treatment with | | |
| Ex. No. | Raw woody Material | 1.5 g/l | 2 g/l | 3 g/l | 1/5 g/l | 2 g/l | 3 g/l |
| 3 | Beech | 0.57 | 0.14 | 0.03 | 1.39 | 0.54 | 0.14 |
| 4 | Willow | 0.51 | 0.15 | 0.04 | | | |
| 5 | Oak | 0.8 | 0.24 | 0.08 | 1.39 | 0.57 | 0.17 |
| 6 | Birch | 0.3 | 0.078 | 0.038 | 0.72 | 0.2 | 0.045 |
| 7 | Poplar bark | 0.8 | 0.3 | 0.09 | | | |
| 8 | Poplar leaves | 1.5 | 0.8 | 0.33 | | | |
| 9 | Apple | 0.46 | 0.14 | 0.078 | 1.14 | 0.42 | 0.15 |
| 10 | Pine | 1.5 | 0.52 | 0.12 | 1.98 | 0.91 | 0.28 |
| 11 | Fir | 0.84 | 0.26 | 0.064 | | | |
| 12 | Spruce | 1.29 | 0.43 | 0.1 | 1.76 | 0.77 | 0.26 |
| 13 | Larch | 1.45 | 0.57 | 0.13 | | | |
| 14 | Cotoneaster | 0.37 | 0.11 | 0.047 | 0.96 | 0.40 | 0.14 |
| 15 | Straw | 0.3 | 0.08 | 0.047 | 0.87 | 0.27 | 0.067 |
| 16 | Hay | 0.57 | 0.2 | 0.06 | | | |
| 17 | Reeds | 0.17 | 0.047 | 0.02 | | | |
| 18 | Bamboo | 0.2 | 0.047 | 0.02 | | | |

TABLE 4

| Ex. No. | pH | Insolubles (% by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 25 | 7–8 | 42.7 | 34.6 | 14.9 | 0.3 | 1.45 | 0.5 | 0.1 |

TABLE 4-continued

| Ex. No. | pH | Insolubles (% by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 26 | 8-9 | 13.5 | 79.1 | 19.9 | 0.16 | 0.38 | 0.09 | 0.019 |
| 27 | 9-10 | 36.3 | 53.5 | 16.8 | 0.18 | 0.64 | 0.15 | 0.037 |
| 28 | 11-12 | 31.7 | 34.7 | | | 4.66 | 2.29 | 1.24 |

EXAMPLES 29 – 33

One part of beech dust was oxidized for 20 hours with 2.6 parts of sodium hypochlorite at a pH of 8 – 9 and at various temperatures, using the procedure otherwise described in Example 2. From the results given in Table 5, it will be noted that the use of reaction temperatures in the range of 10° to 25° C. gives the best results in terms of yields and complexing capacity.

TABLE 5

| Ex. No. | Oxidation temp. (° C.) | Insolubles (% by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 29 | 0 | 37.6 | 60.2 | 16.5 | 0.16 | 1 | 0.29 | 0.05 |
| 30 | 10 | 9.2 | 85.4 | 18.5 | 0.14 | 0.72 | 0.23 | 0.05 |
| 31 | 15-16 | 6.2 | 108 | 29 | 0.12 | 0.57 | 0.17 | 0.042 |
| 32 | 20-25 | 21.5 | 79.6 | 20 | 0.12 | 0.77 | 0.30 | 0.078 |
| 33 | 40 | 16.6 | 110 | 24.4 | 0.12 | 2.9 | 1.69 | 0.72 |

EXAMPLES 34 – 36

One part by weight of straw dust was oxidized with 2.6 parts by weight of sodium hypochlorite at 15° – 20° C. and a pH-value of 8 – 9 in the same manner otherwise described in Example 1 but for periods of 5, 8 and 12 hours. As shown by the results in Table 6, a high yield of product with good complexing properties is obtained after an oxidation of only five hours.

TABLE 6

| Ex. No. | Reaction time (hrs) | Insolubles (° by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 34 | 5 | 30.2 | 83.6 | 17.7 | 0.15 | 0.74 | 0.2 | 0.08 |
| 35 | 8 | 29.5 | 83.9 | 21 | 0.12 | 0.57 | 0.17 | 0.047 |
| 36 | 12 | 31.3 | 83.9 | 21.5 | 0.12 | 0.72 | 0.21 | 0.055 |

EXAMPLES 37 – 39

One part by weight of straw dust was oxidized with 2.6 parts by weight of sodium hypochlorites at 15° – 20° C. and a pH-value of 8 – 9 in the manner otherwise described in Example 2 except for different reaction times of 4, 12 and 20 hours. As shown by the results given in Table 7, longer reaction times are required in the use of Process B than in the use of Process A in order to obtain very good products and yields.

TABLE 7

| Ex. No. | Reaction time (hrs.) | Insolubles (° by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 37 | 4 | 42.3 | 48.3 | 15.2 | 0.18 | 1.83 | 0.69 | 0.13 |
| 38 | 12 | 41.1 | 69.7 | 19 | 0.15 | 1.19 | 0.43 | 0.098 |
| 39 | 20 | 6.2 | 108 | 23 | 0.12 | 0.57 | 0.17 | 0.042 |

EXAMPLES 40 – 42

Straw dust was oxidized with various amounts of sodium hypochlorite at 15°–20° C. and a pH-value of 8–9 for eight hours in the manner described in Example 1. The results given in Table 8 illustrate the fact that at a weight ratio of the woody initial material to the hypochlorite below 1:2, the yield and the complexing properties are poorer than with the use of higher weight or molar proportions.

TABLE 8

| Ex. No. | Straw: NaOCl | Insolubles (° by wt.) | Yield (g/100g) | Na (%) | Ca (%) | Residual hardness (° dH) at | | |
|---|---|---|---|---|---|---|---|---|
| | | | | | | 1.5 g/l | 2 g/l | 3 g/l |
| 40 | 1:1.75 | 41.8 | 68.3 | 17.6 | 0.18 | 1.1 | 0.38 | 0.13 |
| 41 | 1:2.19 | 40.3 | 81.4 | 21 | 0.16 | 0.4 | 0.14 | 0.05 |
| 42 | 1:2.6 | 29.6 | 83.9 | 21 | 0.12 | 0.57 | 0.17 | 0.04 |

EXAMPLE 43

A suspension of 100 g of finely ground poplar wood in 600 ml carbon tetrachloride was reacted at room temperature in a pressure bottle with 117 g of nitrogen dioxide. The closed bottle was then shaken for 20 hours at room temperature. After opening the bottle, the nitrous gases were displaced by introducing nitrogen. The reaction product was then suctioned off, washed with carbon tetrachloride and finally dried. There was obtained 127 g of a yellow powder.

42.2 g of this yellow powder were suspended in 200 ml of water and adjusted to a pH-value of 9 by means of 30.5 ml of a 25% aqueous solution of sodium hydroxide. Then at 15°-20° C and within a period of 30 minutes, 57 g of chlorine were introduced and, while constantly maintaining the pH-value, there were simultaneously added dropwise 64 g of sodium hydroxide as a 40% aqueous solution. After a reaction time of 20 hours, during which an additional 24 ml of a 25% sodium hydroxide solution were consumed to maintain the pH-value, the reaction mixture was filtered. After pouring the filtrate into 1200 ml of methanol, suction filtering and drying the precipitate, 28.8 g of oxidation product were obtained. The sodium content of the product amounted to 23.9% by weight.

In testing the complexing capacity of the product, the following results were determined:

| Treatment With | Residual Hardness |
|---|---|
| 1.5 g/l | 0.49 ° dH |
| 2.0 g/l | 0.14 ° dH |
| 3.0 g/l | 0.72 ° dH |

EXAMPLE 44

132.1 g. of sodium periodate were dissolved in 2.4 liters of water and reacted with 8 ml of concentrated hydrochloric acid. After flushing the solution with nitrogen, 100 g of poplar sawdust were introduced at 20° C. The suspension was then stirred for six days in the dark. After suctioning off the product and washing it with water, 90.5 g of oxidized material was obtained as an intermediate. 15 g of this intermediate product were suspended in 400 ml of water. 52 g of sodlum chlorite (technical grade, 80%) were dissolved in the suspension. Then, a total of 16 ml of glacial acetic acid was added in small increments or portions. The mixture was stirred for about 20 hours at room temperature, then flushed with nitrogen, adjusted to a pH of 9 with sodium hydroxide and finally filtered. The filtrate was poured into 1.5 liters of methanol to precipitate the desired oxidation product which was separated thereby in an amount of 5.7 g and with a sodium content of 15.1% by weight.

In testing the complexing capacity of this oxidation product, the following results were determined:

| Treatment With | Residual Hardness |
|---|---|
| 1.5 g/l | 0.37 ° dH |
| 2.0 g/l | 0.076 ° dH |
| 3.0 g/l | 0.014 ° dH |

EXAMPLE 45

This is a comparative example carried out in accordance with Example VIII of the Netherlands Patent (NL-PS) 78,087.

5 kg of straw were treated for 48 hours at room temperature with 150 liters of nitric acid (density = 1.4) of 0° C, and 5 kg of sodium nitrite. After washing with water and drying, there were obtained 1.35 kg of a product with 4.5 milliequivalents/gram of basic binding groups and a sodium content of 10.3% by weight.

In testing the product for its complexing capacity, the following results were determined:

| Treatment With | Residual Hardness |
|---|---|
| 1.0 g/l | 6.1 ° dH |
| 2.0 g/l | 2.7 ° dH |
| 3.0 g/l | 1.6 ° dH |

EXAMPLE 46

This is a comparative example carried out in accordance with the third and fourth tests described on page 3 of German Patent (DT-PS) 930,388 with a mechanical wood pulp, using 5 g of wood pulp, 14 cc of $HNO_3$ (density = 1.43), 3 g of $Na_2S_2O_5$ or 3 g of $Na_2S_2O_4$. The results are summarized in the following table.

| Ex. No. | Yield (g) | Na (%) | Basic binding groups Milli-equiv./gram | Residual hardness on treatment with | | |
|---|---|---|---|---|---|---|
| | | | | 1 g/l | 2 g/l | 3 g/l |
| 3 | 2.23 | 8.2 | 3.6 | 6.7 | 3.7 | 2.3 |
| 4 | 2.37 | 7.8 | 3.4 | 7.4 | 4.0 | 2.5 |

Based on the foregoing examples, including the various comparative experiments, it can be readily observed why the use of oxidized woody plant materials as complexing or sequestering additives offered no commercial possibilities in the prior art, whereas it is now feasible for the first time to obtain a mixture of oxidation products in a very direct manner from woody plant materials, i.e., using very inexpensive raw materials which are available in large quantities in wood related industries. The excellent properties of the new mixture of oxidation products permit widespread application as the complexing, sequestering or chelating component of many aqueous compositions, especially surface active detergents and cleaning agents.

For making up the surface active detergent or cleaning composition of the invention based on the new oxidation products, one can of course provide dry compositions for later addition to water or aqueous baths, and if desired, such dry compositions may be prepackaged in suitable proportions with the surface active agent and other useful additives such as bleaches, fillers, builders, etc., depending upon the intended use of the packaged composition. These and other variations in the use of the additive mixtures of the invention will be readily apparent to those skilled in the art.

The invention is hereby claimed as follows:

1. A process for the production of a mixture consisting primarily of oligomeric and polymeric oxidation products of cellulose, hemicellulose and lignin containing carboxy, ether and hydroxy groups which comprises:

oxidizing a woody plant material in aqueous suspension in a single stage with alkali hypohalite as the essential oxidizing agent or in two stages with nitrogen dioxide, alkali periodate or lead tetraacetate as the essential oxidizing agent of the first stage and with alkali chlorite or alkali hypochlorite as the essential oxidizing agent in the second stage, the total amount of oxidizing agent being at least two parts by weight for each part by weight of said woody plant material;

separating undissolved components; and precipitating the oxidation products from the aqueous medium by means of a water-miscible organic precipitating agent.

2. A process as claimed in claim 1 wherein the oxidation with an alkali hypohalite is carried out at a pH-value in the range of about 8 to 10 and in a temperature range of about 0° to 40° C.

3. A process as claimed in claim 2 wherein said temperature range is about 10° to 25° C.

4. A process as claimed in claim 1 wherein sodium hypochlorite is used as an oxidizing agent.

5. A process as claimed in claim 1 wherein the organic precipitating agent is a primary, secondary or tertiary alcohol of 1 to 4 carbon atoms.

6. A process as claimed in claim 1 wherein the two stage oxidation is carried out with nitrogen dioxide in the first stage and sodium hypochlorite in the second stage.

7. A process as claimed in claim 4 wherein the oxidation is carried out in a single stage with said sodium hypochlorite as the essential oxidizing agent at a pH-value of about 8 to 10 and at a temperature of about 0° to 40° C.

8. A process as claimed in claim 7 wherein said temperature is about 10° to 25° C.

9. A process as claimed in claim 1 wherein the total time of the oxidation is at least about 5 hours.

10. A process for the production of a mixture consisting primarly of oligomeric and polymeric oxidation products of cellulose, hemicellulose and lignin containing carboxy, ether and hydroxy groups which comprises oxidizing a woody plant material in a single stage with alkali hypohalite as the essential oxidizing agent or in two stages with nitrogen dioxide, alkali periodate or lead tetraacetate as the essential oxidizing agent of the first stage and with alkali chlorite or alkali hypochlorite as the essential oxidizing agent in the second stage with the proviso that halogen and an aqueous alkali hydroxide are simultaneously conducted into an initial aqueous suspension of the woody plant material being oxidized, the total amount of oxidizing agent being at least two parts by weight for each part by weight of said woody plant material.

11. A process as claimed in claim 10 wherein the oxidation is carried out in a single stage with said sodium hypochlorite as the essential oxidizing agent at a pH-value of about 8 to 10 and at a temperature of about 0° to 40° C.

12. A process as claimed in claim 11 wherein said temperature is about 10° to 25° C.

13. A process as claimed in claim 11 wherein the total reaction time for the oxidation is about 5 to 10 hours.

* * * * *